Sept. 24, 1935.    H. W. ROYCE    2,015,289
TEMPERATURE CONTROL DEVICE
Filed July 18, 1932    3 Sheets-Sheet 1
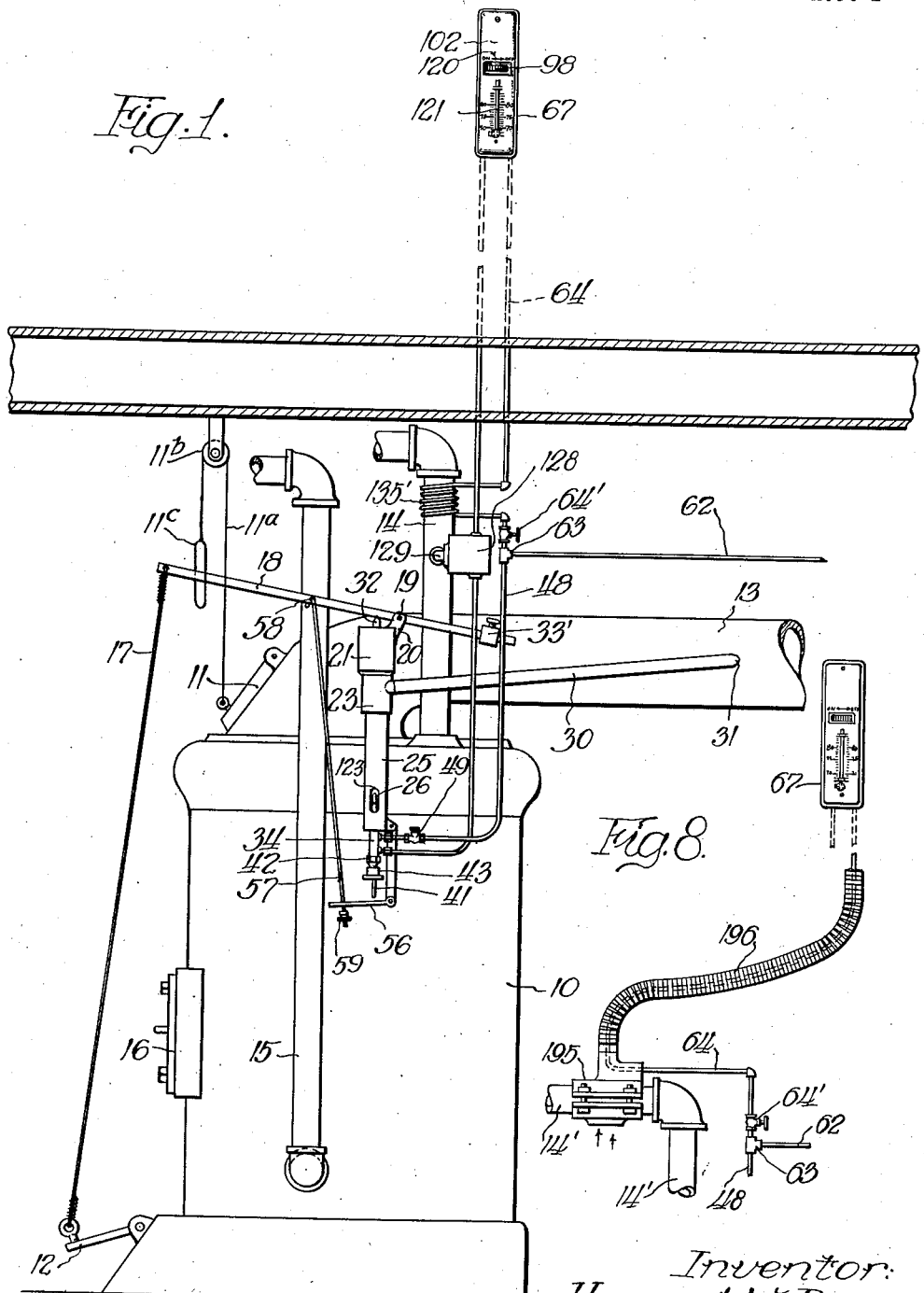
Inventor:
Howard W. Royce

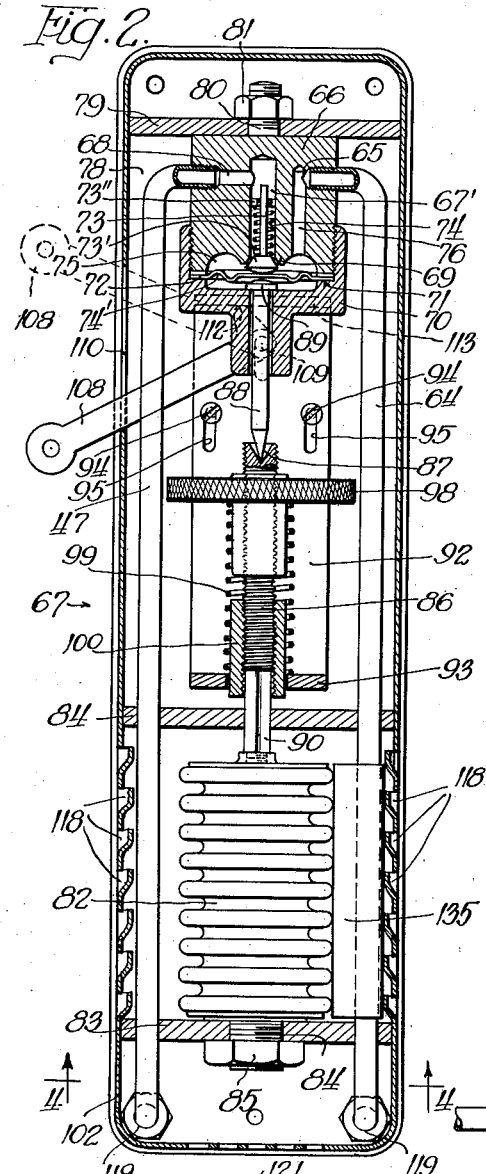
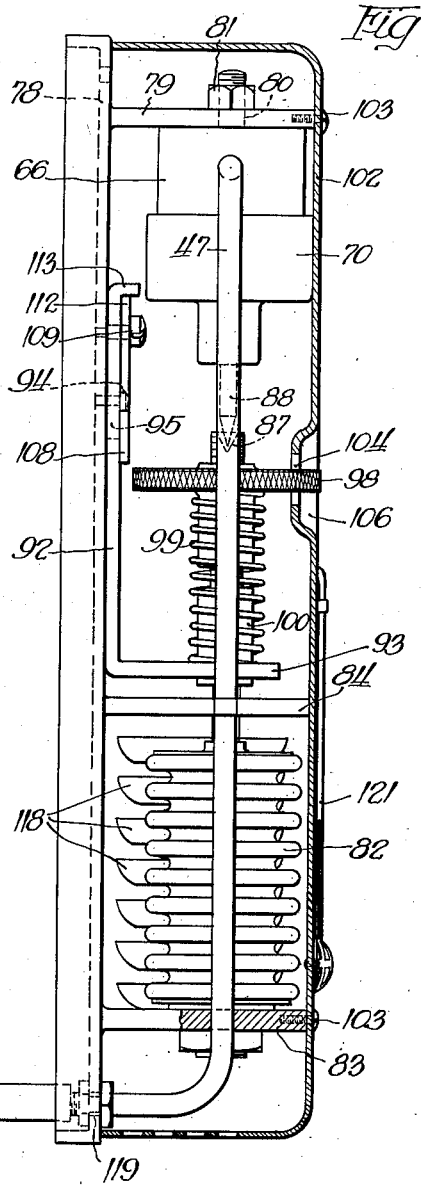
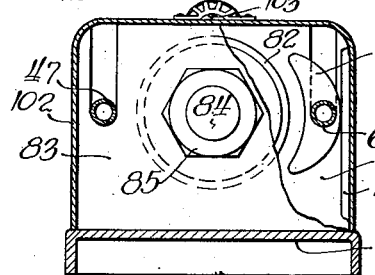

Sept. 24, 1935.   H. W. ROYCE   2,015,289
TEMPERATURE CONTROL DEVICE
Filed July 18, 1932   3 Sheets-Sheet 3
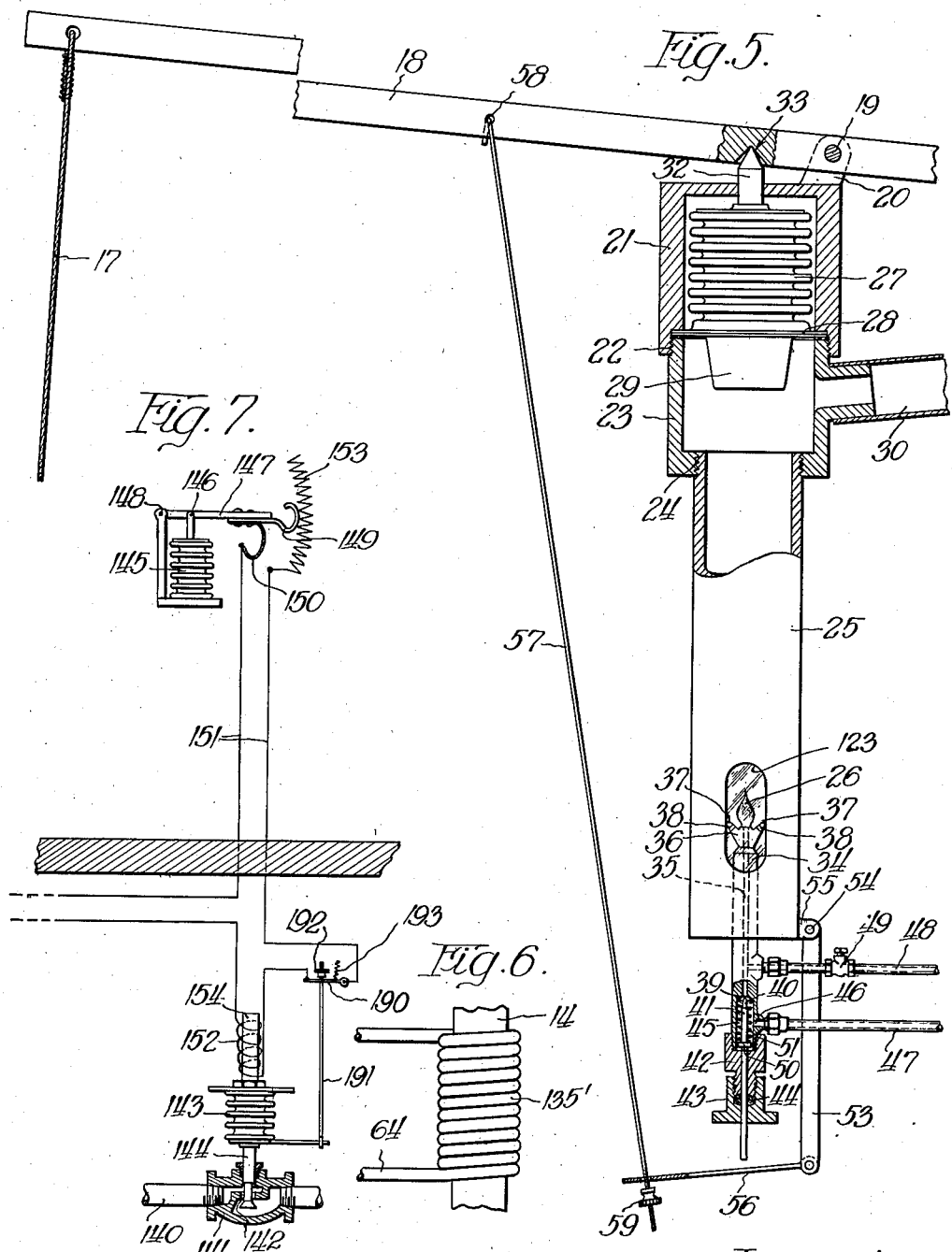
Inventor:
Howard W. Royce.
By Brown, Jackson, Boettcher & Dienner
Attys.

Patented Sept. 24, 1935

2,015,289

UNITED STATES PATENT OFFICE 2,015,289

TEMPERATURE CONTROL DEVICE

Howard W. Royce, Chicago, Ill., assignor to Frank B. Thacher, Chicago, Ill.

Application July 18, 1932, Serial No. 623,135

10 Claims. (Cl. 236—68)

This invention relates to temperature control devices, and particularly to temperature control devices of the thermostat type.

While the invention is particularly adapted for the heat regulation of buildings, especially buildings of the domestic dwelling type and will be explained in connection with such use, it is understood that the invention may be employed for other heat regulating purposes as suitable and desired.

In the ordinary temperature controlling arrangement, a thermostat element is employed to move a lever or like member into and out of engagement with a contact or between two contacts to control, in response to temperature changes, circuits which in turn lead to some type of device which opens or closes the dampers, valves or other appliances for varying the supply of heat. Devices of this type have not been entirely satisfactory due to the fact that they operate only at "on" or "off" positions, or with the dampers, valves or other appliances in full open or completely closed position. These devices have also not tended to compensate satisfactorily for the thermal lag between the heat supply and the space warmed.

It is the general object of my present invention to provide a generally improved temperature control device that is highly efficient, comparatively inexpensive and which will provide a closer control of the temperature, and thereby a more uniform temperature in the room or other space which is warmed, and a saving of fuel.

More particularly, it is an object of my invention to provide a control device that will bring to an intermediate position the dampers, valves or other alliances for varying the heat supply, thereby substantially balancing the heat requirements, and which will operate these parts at substantially that position instead of only at wide open or completely closed position.

Another object is to provide a control device which will automatically tend to compensate for the thermal lag between the heat supply and the space warmed.

Another object is to provide a control having a temperature limit to the operating bellows, to prevent overheating and consequent damage in periods of long action, and a control device in which all parts are so arranged that in case of failure to act the draft or other appliances will be closed.

Another object is to provide a control device having no rapidly moving parts to wear out and no delicate members to get out of adjustment.

In carrying one embodiment of my invention into effect I provide for maintaining a pilot flame in close proximity to a thermostat which may be located at or near and connected to operate the dampers, valves or other appliances for varying the heat supply. The thermostat in the room where the temperature is to be controlled controls the flame at the thermostat that operates the dampers, valves or other heating supply varying appliances. A gas or other fuel supply line maintains the flame at least at relatively restricted pilot proportions at all times. A lost motion connection between the lever or other member which operates the dampers, valves or other appliances and the valve for the burner which operates the thermostat that in turn operates the lever or member for controlling the dampers or other appliances limits automatically the fuel supply for the heating flame, and thereby the operation of this thermostat.

It is another object of my invention to protect the pilot flame at all times from drafts. This flame is always increased or decreased gradually, and consequently with the absence of "pops" so that it will at all times remain lit unless the gas supply fails. If the gas supply should fail and afterward resume nothing serious will happen, because the damper will close and the unburned gas will be carried through a vent to the chimney.

Another obect is to provide an improved valve which is controlled by the thermostat in the room, and which in turn controls the gas supply to the heating flame, also a hydrostat arrangement for preventing excessive temperatures and improved means for equalizing the thermal lag.

The present invention provides further for obtaining, in an electric regulator, an intermediate action of the valve means, dampers or other appliances for varying the heat supply.

Other objects and advantages of the invention and the features which are believed to be novel and patentable will appear from the following detailed description taken in connection with the accompanying drawings, in which:

Figure 1 is a view illustrating the application of the invention to a house furnace control;

Figure 2 is a view of the thermostat device which is arranged in the room or other space where the temperature is to be controlled, and showing the same partially in section and partially in elevation;

Figure 3 is a side elevational view of the thermostat device shown in Figure 2, with the cover and other portions in section;

Figure 4 is a sectional view taken on the line 4—4 of Figure 2;

Figure 5 is an enlarged view, partially in elevation and partially in section, showing the thermostat device which is connected to operate the dampers, valves or other appliances and the burner or pilot flame disposed beneath the same.

Figure 6 is a fragmentary detail view showing a portion of the inlet line to the valve at the room thermostat wrapped around a heater;

Figure 7 is a view showing more or less diagrammatically an arrangement for obtaining an intermediate action in an electric regulator.

Figure 8 is a fragmentary view showing a hot air conduit around the gas line extending to the room thermostat.

In the embodiment of the invention illustrated in Figures 1 to 5, 10 represents the furnace, 11 and 12 its control dampers, 13 the smoke flue, 14 the hot water pipe, 15 the cold water return pipe, and 16 the fire door.

The damper 12 is connected by a wire, rod or like element 17 to a lever 18, which is pivoted at 19 to an integral lug 20 on the top of an inverted cup-shaped member 21, as shown in Figure 5. The member 21 is attached at 22 to the top of a cup-like member 23, which in turn is mounted at 24 upon the upper end of the tube or stand pipe 25 for the flame 26. The member 21 encloses a thermostat 27 of the bellows type, which may have a fold 28 clamped and held between the members 21 and 23, and an uncorrugated part 29 extending down into the member 23 to receive the heat from the flame 26. The member 23 has a lateral vent connected to a pipe 30, which in turn is connected at 31 to the smoke flue 13 to carry unburned gases out from the member 23 to the chimney if by chance the gas supply for the flame 26 should fail without at once being noticed and afterwards resume.

The upper end of the bellows has a stem 32 passing slidingly through the top of the member 21 and tapered at its upper end for engagement in a tapered socket 33 in the lever 18. Upon expansion of the fluid contained within the bellows 27, under the action of the flame 26, the bellows expands and the stem 32 lifts the lever 18 about the pivot 19 to open the damper 12 an amount in proportion to the size of the flame 26. Upon contraction of the bellows 27, the damper 12 may drop by gravity to or toward closed position an amount equal to the amount of contraction of the bellows. The closing movement of the damper may be augmented by spring means or otherwise as desired. For the purpose of reducing the amount of work which must be done in lifting the lever 18 to open the damper, the right hand end of the lever 18 (Fig. 1) is extended beyond the pivot 19 and provided with a counterweight 33'. This counterweight is adjustable, and by setting it to counterbalance approximately the damper 12, the work done by the bellows 27 in lifting the lever 18 need be only that necessary to overcome the state of balance between the damper 12 and the counterweight 33'.

A flexible element 11a connected to the check damper 11 is trained over a sheave 11b and has a lost motion connection at 11c with the lever 18. The lost motion connection at 11c may be formed by a loop on the element 11a engaged over the lever 18. This connection opens the check damper 11 as the damper 12 is completely closed and permits the check damper to close upon initial opening movement of the damper 12. At the same time it permits the damper 12 to move to full and intermediate open positions independently of the check damper 11.

The flame 26 is maintained at the tip of a burner which is of the Bunsen type and comprises an upright stem 34 provided with an axial passage 35 opening axially at its upper end from the tip 36, which tip has oblique wings 37 apertured at 38 for maintaining the necessary supply of air for the flame 26. The lower end of the passage 35 terminates in a tapered seat 39 with which the tapered upper end 40 of a valve stem 41 is adapted to cooperate to close off the supply of gas or other fuel into the lower end of the passage 35. The valve stem 41 slides vertically in a gland member 42 threaded upon the lower end of the stem 34, and a gland nut 43 threaded upon the reduced lower end of the member 42 presses the packing 44 tightly about the stem 41 to permit sliding movement of this stem and at the same time to seal the vertical passage in the member 42 in which the stem slides.

Below the lower end of the passage 35 is an enlarged passage 45 having a lateral inlet 46 connected with a pipe 47 for supplying gas or other fuel to the burner. Above its lower end the passage 35 is connected laterally with a pipe 48 for supplying gas or other fuel in quantities sufficient to maintain a restricted pilot flame at the tip 36. The pipe 48 has a valve 49 for adjusting the pilot flame at will. The stem 41 has a flange or shoulder 50 and a spring 51 coiled about the stem 41 and confined between the shoulder 50, and the valve seat 39 normally holds the valve stem 41 in open position as shown in Figure 5.

An arm 53, rigidly secured at 54 to a lug 55 integral with the lower end of the tube 25, has pivoted at its lower end a lever 56, and a rod 57 connected at 58 to the member 18 passes at its lower end through an opening in the lever 56 and has threaded thereon a thumb nut 59. The rod or like member 57, with the nut 59 and lever 56, forms a lost motion limiting connection between the lever 18 and the valve stem 41 to limit automatically the gas supply to the tip 36 by way of the pipe 47, and thereby the expansion of the bellows 27. Upon a predetermined lift or clockwise movement of the lever 18 about its pivot 19, under the expanding action of the bellows 27, the lever 56 strikes the lower end of the stem 41 and lifts the same until the upper end engages the valve seat 39 or within the lower end of the passage 35 and closes off the entry of further gas from the pipe 47 to the passage 35 and consequently to the tip 36.

The pipe 62 (Fig. 1), which may be one of the gas supply mains of the residence or any other suitable or desired fuel supply line, is connected to a T 63. The pipe 48 leads from one side of the T 63 and, as already explained, has the valve 49 for adjusting the supply of fuel to maintain the desired restricted pilot flame at 26.

Leading from the opposite side of the T 63 is a gas or fuel line 64, which is connected to and opens at its opposite end into a lateral inlet passage 65 in a valve body 66, which is positioned in proximity to the thermostat 67 in the room or other space where the temperature is to be controlled. The fuel line 64 has therein a suitable valve 64'. The valve body 66 has an axial outlet 67' which opens into an outlet passage 68. The tube 47, which is connected below the valve seat 39 to deliver fuel to the tip 36 for the purpose of increasing the flame 26 with decreases in the temperature of the room or like space, extends to the room thermostat 67 and is connected with the outlet passage 68 as shown in Figure 2.

At the lower end of the outlet passage 67' the valve body 66 has a tapered valve seat 69, and a ferrule or cover 70 is threaded upon the lower end of the valve body 66. The ferrule 70 has an internal shoulder 71 between which and the lower end of the body 66 a flexible diaphragm 72 is clamped and held peripherally. The central portion of the diaphragm 72 underlies a valve plug member 73 having at its lower end a head tapered at 73' for cooperation and engagement with the tapered seat 69. The stem of the valve plug member 73 is positioned and slidable axially within the outlet 67' in a guide 73", and a spring 74 coiled about the stem of the valve member 73 and confined between the guide 73" and the head of the valve member 73 normally urges the valve member yieldingly to open position.

Instead of providing the separate valve plug member 73, a suitable conical valve member or metering pin may be mounted upon the central part of the diaphragm for cooperation with the tapered valve seat 69. As further alternatives, the central part of the diaphragm 72 may be raised to provide a generally conical portion for cooperation with the valve seat 69, or the central part of the diaphragm may be relatively flat or provided with a valve disc member attached thereto and adapted for cooperation with the seat 69. The arrangement shown provides, at the thermostat device 61, an effective metering valve for the gas, which valve lends itself to bringing the dampers, valves or other appliances to an intermediate position substantially balancing the heat requirements and to operation of these parts at substantially that position instead of only at wide open or completely closed positions. The diaphragm 72 may have an annular corrugation 74' for permitting the desired movement of the central part of the diaphragm.

The stabilizing effect of the valve member 73 is due to the fact that the maximum amount of gas permitted to flow at any time to the heating burner is determined by the valve 64'; therefore, with the thermostatic valve 73 closed, the full pressure of the gas supply is exerted on the diaphragm, in the annular space, tending to open the valve 73.

As soon as this valve opens slightly and the gas begins to flow, the pressure on the diaphragm is reduced, tending to stay the valve 73 at an intermediate opening, which it does until further contraction of the thermostatic bellows overcomes this loss of opening tendency. Conversely, valve 73 in closing tends to pause in an intermediate position.

Surrounding the valve seat 69 is an annular inlet space 75 into which the inlet passage 65 opens through a vertical passage 76. In this manner the pressure of the gas in the line 64 acts upon the top of the diaphragm 72 over a relatively great annular area, and this, with the arrangement of the inlet and the outlet on the same side of the diaphragm, provides a valve in which the valve member 73 follows immediately any downward flexing of the diaphragm 72 and assures a true metering of the gas supply at all times. The pressure of the gas in the space 75 together with the spring 74 will overcome at all times any tendency of the valve member to stick to its seat 69, as well as the inertia of these parts.

Formed integral with and projecting from the base 78 of the thermostat device 67 is an upper shelf 79. The valve body 66 is secured firmly to the shelf 69 by means of a stud 80 formed integral with the valve body 66 and extending up through an opening in the shelf 79 and engaged in a nut 81.

The thermostat element 82 of the thermostat device is of the bellows type, and is positioned between lower and intermediate shelves 83 and 84 integral with and extending from the base 78. It is understood, of course, that each bellows 82 and 27 contains an expandable fluid as well known in the art. The lower end of the bellows 82 is secured firmly to the shelf 83 by means of a stud 84 extending from the lower end of the bellows through an opening in the shelf 83 and threaded into a nut 85. The upper end of the bellows 82 has a stem 86 extending up through the shelf 84 and provided at its upper end with a conical depression 87, the apex of which is on the axis of the stem 86 and engages the tapered lower end of a valve actuating pin 88. The pin 88 slides loosely in an axial opening in the ferrule 70, and at its upper end has a head 89 which cooperates with the lower side of the diaphragm 72 beneath the head of the valve member 73 and is adapted to be raised to move the diaphragm upwardly and the valve member 73 to or toward engagement with the seat 69 to close off communication from the inlet space 75 to the outlet 67'. The lower end is of polygonal section at 90, and the opening in the shelf 84 through which the stem extends may be of corresponding form to prevent turning of the stem.

An angular member 92 is mounted upon the base 78 with one leg flat against the base and the other leg 93 extending out generally normal to the base. The leg 93 has an opening through which the stem 86 passes. The member 92 is held to the base 78 by cap screws 94, the openings in the member 92 through which the shanks of these screws extend being elongated at 95 to permit vertical adjustment of the member 92 with respect to the base 78.

Threaded upon the stem 86 is a thumb nut 98, and centered upon the hub of this nut and interposed between the nut and the outstanding leg 93 is a coiled spring 99. A sleeve 100 may be threaded upon the stem 86 and passes loosely through the opening in the leg 93.

The cover 102 encloses the bellows 82 and the associated valve body and connecting parts, and is secured to the base by screws 103 (Fig. 3). The cover 102 may, of course, be merely snapped into place or it may be mounted in any other suitable or preferred manner. The peripherally knurled flange of the nut 98 extends through an opening 104 in the front of the cover 102, the nut 98 having free turning movement and also movement in an axial direction in the opening 104. Turning of the nut 98 in one direction tensions the spring 99, and turning of the nut 98 in the opposite direction decreases the tension in the spring 99, this adjustment, by means of the nut 98, of the tension in the spring 99 adjusting the room temperature at which the device will operate.

Tensioning of the spring 99 reduces the expansion of the bellows 82 necessary to close the valve 73, and consequently the room temperature at which this valve is closed. In this manner the device may be set to maintain any desired temperature under any outside temperature conditions, as well as in different dwellings in which the insulating properties will vary.

Conversely, of course, turning of the nut 98 in the opposite direction reduces the tension in the spring 99 and consequently increases the amount of expansion of the bellows 82 necessary to seat the valve 73 with the result that the room temperature at which the valve 73 is closed is increased.

For two stage heating, a lever 108 is pivoted at 109 to the base 78 and extends out through a vertically elongated slot 110 in one side of the cover 102. At its pivoted end the lever 108 has a cam finger 112, which cooperates with an outturned lip 113 at the upper end of the angular member 92. When the lever 108 is swung to its upper dotted line position, as shown in Figure 2, the cam finger 112 will, by its engagement with the lip 113, lift the member 92. This upward movemnt of the member 92 increases the tension in the spring 99 and consequently reduces the amount of expansive effort necessary in the bellows 82 to seat the valve 73. The thumb nut 98 is operable with the lever 108 in raised position in the manner in which it is operable with this lever in its lower position to obtain the relatively fine adjustments in the manner already described.

The lever 108 may be connected to a suitable clockwork mechanism for automatically throwing the lever 108 up to its two stage position at night, or at any other time as suitable or desired.

The sides of the cover 102 along the bellows 82 may be provided with ventilating louvers 118, as shown, and the tubes 47 and 64 are shown extending vertically along the opposite sides of the bellows and valve parts within the cover 102 and connected out through the back of the base 78 at 119, 119. Suitable markings 120 may be provided on the front of the cover for the thumb nut or dial member 98, and a thermometer may be provided at 121. The upright tube 25, which encloses the pilot flame, has an opening 123, which may be closed with mica or like material, and permits inspection of the flame 26 from the outside.

The operation of the apparatus as thus far described is as follows:

The tube 48 supplies gas in quantities sufficient to maintain a constantly burning pilot flame at the tip 36. As the temperature in the room drops the bellows 82 contracts and moves the stem 86 downwardly, which permits the pin 88 to drop from its position holding the valve 73 closed. The valve 73 immediately opens from its seat 69 under the pressure of gas in the annular space 75 and the action of the spring 74 and sets up a flow of gas through the line 47 to the tip 36 to increase the flame 26. The heat of this increased flame rises in the stand pipe 25 and expands the bellows 27. The stem 32 moves upwardly with the expansion of the bellows 27 and lifts the lever 18 which in turn opens the damper 12 an amount in direct proportion to the size of the flame 26.

If the room is quite cold, the contraction of the bellows 82 may be sufficient not only to open completely the valve 73, but to move the head 89 downwardly an amount beyond that necessary to obtain full open position of the valve 73, or the stem 86 may move away from the lower end of the pin 88 to provide clearance between these parts. The downward movement of the stem 86 may be limited by engagement of the lower end of the sleeve 100 with the shelf member 84. This downward movement of the head beyond that necessary to obtain full open position of the valve 73 or downward movement of the stem 86 away from the pin 88 will increase the period of full open position of the damper 12 sufficiently to bring the temperature of the room to that desired. Within certain limits the lower the room temperature the greater will be the contraction of the bellows 82 and consequently the greater the period of full open position of the valve 73.

As soon as the damper 12 is opened the heater supplies more heat to the room. As the temperature of the room rises, the bellows 82 expands and moves the stem 86 upwardly. When the temperature rise is sufficient, the movement of the stem will take up first any clearance or any positioning of the pin 88 below full open position of the valve 73, and as the temperature rises above that at which the valve 73 will remain in full open position, this valve member 73 will be moved upwardly toward its seat 69. This reduces the supply of gas to the heating burner 36 by way of the line 47 which, in turn, reduces the flame 26. As the flame 26 is reduced, the bellows 27 contracts an amount corresponding to the reduction of this flame, and the damper 12 drops toward closed position also a corresponding amount. When the room temperature rises above that at which the device is set for the valve 73 to close, this valve moves into engagement with the seat 69 and closes off completely the supply of gas to the tip 36 by way of the line 47, whereupon the flame 26 resumes its restricted pilot proportions.

In operation the control device will bring the valve 73 and consequently the damper 12, valve or other appliance to an intermediate position substantially balancing the heat requirements for which the device is set. As the temperature drops below that for which the device is set, the valve 73 will open an amount corresponding with the temperature drop and will open the damper 12 a corresponding amount and as the temperature rises above that for which the device is set, the valve 73 will be moved toward closed position a corresponding amount and will cause the damper 12 to close a corresponding amount. The fire, and likewise the room temperature, is thus kept under very close control, resulting in very favorable furnace operating conditions as regards the complete and economic consumption of fuel. The lag between full open and completely closed positions of devices of the "on" and "off" type is avoided, and the present device compensates satisfactorily for the thermal lag between the heat supply and the space warmed.

A hydrostat is provided at 128 (Fig. 1) for preventing excessive temperatures. For hot water heating plants, it may comprise, for example, a thermostatically operated valve connected to some portion of the generator for preventing heating of the water up to or beyond a predetermined limit, for example, 200 degrees Fahrenheit when the outside temperature is relatively high. This valve may be operated by the heat of the generator, and prevents overrunning the requirements. In the illustrated embodiment its thermal sensitive element is connected at 129 to the hot water outlet pipe 14, and the valve part is connected into the pipe line 47 to close off completely the supply of gas to the heater tip through this line when the temperature of the hot water line has reached or exceeded a predetermined temperature.

For the purpose of equalizing the thermal lag, the tube 64 may be provided with a radiating chamber 135, shown in Figure 4, of generally crescent shape in horizontal section, and positioned to embrace partially the bellows 82. Ahead of the chamber 135 the tube 64 is wrapped or coiled at 135' around a suitable heater, preferably around a portion of the hot water pipe 14, as shown in Figure 6. The gas which flows through the line 64 upon opening the valve 73 is thus heated, and it is heated ahead of the chamber 135.

To maintain the line 64 heated up to the room thermostat 67, the hot water pipe 14 may be provided with a saddle 195 connected by a flexible conduit 196 with the room thermostat 67, as shown in Figure 8. The saddle 195 is arranged to permit air to enter and pass around the pipe 14 where it is heated and carried up to the thermostat 67. The line 64 is led through the conduit 196 and is heated by the heated air therein and maintained heated up to the thermostat 67. The line 64 may be provided with the coil 135', as before, or in this case this coil may be omitted.

As soon as the valve 73 is opened, the heat of the warm gas passing through the chamber 135 is radiated from the chamber 135 upon the bellows 82. The effect of this heater upon the bellows 82 will depend upon the heating capacity of the chamber 135, its proximity to the bellows 82, the extent to which the two parts are enclosed, et cetera, which factors may be adjusted to whatever is desired. In addition the effect of the heater upon the bellows 82 may depend upon the rate of flow of the heated gas through the line 64, which in turn will be dependent upon the amount of opening of the valve 73.

If the room is quite cold, the chamber 135 may not give off heat sufficient to expand the bellows 82 sufficiently to move the valve 73 to or toward closed position, but if the room is only slightly below the desired temperature, the additional heat from the chamber 135 may be such as to cause the valve 73 to close or to move toward closed position shortly after it is opened or moved toward open position. Thus the nearer the temperature of the room is to the desired temperature the quicker will the valve 73 act to or toward closed position.

In the embodiment of Figure 7 I have shown more or less diagrammatically an arrangement for obtaining an intermediate action in an electric regulator. In this embodiment 140 indicates the line for supplying gas or oil to the burner of a heating plant using gas or oil. The device for varying the supply of heat comprises a valve for regulating the fuel supply through the line 140, this valve being indicated at 141 and comprising a valve body having a metering orifice 142 through which the fuel passes from the inlet to the outlet side of the valve. The heat varying device instead of being in the form of a valve as shown, may be in the form of dampers or other suitable appliances within the scope of this embodiment. The thermostat 143, which in this case constitutes the actuator for the valve 141 or other appliance, is shown as being of the bellows type and has on its lower end the valve pin provided with a conical or tapered metering head 144. This pin is raised and lowered by contraction and expansion of the bellows 143, and its tapered lower end cooperates with the orifice 142 to meter or regulate the flow of fuel through the line 140.

A second thermostat 145, also shown as of the bellows type and arranged within the room or other space to be heated, has at its upper end an upwardly extending stem pivotally connected at 146 to a lever 147, which lever is pivoted at 148 to one side of the connection 146. On the opposite side of the connection 146 the lever 147 has a contact spring 149 connected at 150 to one side of a current source or electric circuit 151. The opposite side of the line or source 151 is connected to one end of a heater coil 152, and the opposite end of this coil 152 is connected to a resistance element 153. The contact spring 149 operates over the resistance element 153 forming a rheostat for adjusting the resistance in the circuit 151 automatically with the expansion and contraction of the bellows 145. The coil 152 is wrapped or convoluted around a tubular extension 154 of the bellows 143, or directly around the bellows 143 itself, it being understood that where there is an extension 154 that it is a part of the bellows and in open communication with the interior of the bellows 143 which contains expandible fluid as does the bellows 145.

The operation of the embodiment of Figure 7 is as follows:

Where the heating plant is of the oil or gas burning type, a suitable pilot lighter may be provided as well understood in the art. As the temperature in the room drops the bellows 145 contracts and moves the lever 147 in a clockwise direction about its pivot 148. The accompanying movement of the contact spring 149 over the resistance element 153 reduces the resistance in the circuit 151. This energizes the heater 152, which begins to give off heat, and heats the bellows 143. The bellows 143 expands and opens the valve 141 by moving the metering head 144 downwardly away from its seat. The opening of the valve 141 immediately sets up a flow of gas or oil through the line 140 to the gas or oil burner of the heating apparatus.

As the temperature in the room rises, the bellows 145 expands and moves the lever 147 in a counter-clockwise direction about its pivot 148. This increases the resistance in the circuit 151 with an accompanying complete deenergization or a decrease in the energization of the heater 152. This deenergization or a decrease in the energization of the heater 152 discontinues completely or reduces the heat given off thereby and the bellows 143 contracts to close completely or partially the valve 141. This reduces or discontinues the flow of gas or oil through the line 140 and the flame at the gas or oil burner of the heating apparatus is reduced or turned off completely.

The bellows 143 can be used direct as bellows 27 to operate the dampers or other appliances for varying the supply of heat. The amount of opening of the valve 141 varies with the heating action of the coil 152 and in that the heating action of this coil is varied with the amount of contraction and expansion of the room thermostat bellows 145, it will be apparent that, as before, the valve 141 or other appliance for varying the heat supply will be brought to an intermediate position and will be operated at substantially that position instead of at wide open or completely closed position. The effect of this heater 152 on the bellows 143 will depend upon the heating capacity of coil 152, its proximity to the member 143, the extent to which the two parts are enclosed, et cetera, which factors may be adjusted to whatever desired. This provision of a rheostat for varying with the room temperature the amount of heat given off by the heater 152, and consequently with the amount of expansion and contraction of the bellows 145, is, so far as I am aware, broadly new.

In order to avoid overheating of the bellows 143, the circuit 151 may be provided with a make and break switch 190 adapted to be opened automatically by a predetermined expansion of the bellows 143. For this purpose the lower end of the bellows 143 has an extending arm and connected thereto is a rod 191 or like member, which passes through or along the pivoted blade of the make and break switch 190 and has adjustable thereon an abutment 192 which, upon a given expansion of the bellows 143, strikes the switch arm or blade and swings the same to open position. The switch 190 may be closed automatically upon release of the abutment 192 by a spring 193 or by any other suitable or preferred means.

It is to be understood that the apparatus shown and described is only illustrative and that the invention may be carried out by other means.

It is to be understood also that while I have shown and described the bellows 27 for use in operating the damper or regulator 12, that the action of this bellows 27 may be employed for doing any other kind of work as suitable or desired.

The heater coil 152 of the embodiment of Figure 7 may, within the scope of the present invention, take the place of the gas burner below the bellows 27 of the embodiment of Figures 1 to 6.

I claim:

1. In combination, a heater for a space to be heated, means for regulating said heater, a thermostat for operating said regulating means, a gas burner for heating said thermostat, a gas supply line for said burner, a valve for controlling said supply line, a thermostat subject to the temperature of said space for operating said valve with variations in the temperature of said space, said gas supply line having a portion disposed in proximity to said last thermostat for transmitting heat by radiation thereto, and means for heating said gas supply line anterior to the portion disposed in proximity to said last thermostat whereby when said thermostat operates to open the valve in the fuel supply line the supply of heated gas through said line heats said thermostat and tends to hasten the closing of the valve in the fuel supply line when the temperature of the room is near the desired temperature.

2. In combination, a heater, a damper for said heater, a lever connected to open said damper, a first thermostat for operating said lever, a burner for said thermostat, a line for supplying fuel to said burner in quantities to maintain a relatively restricted pilot flame at the burner, a line for supplying increased quantities of fuel to said burner to heat said thermostat, a valve in said last line, a second thermostat arranged in a space to be heated and controlling said valve with variations in the temperature of said space, a second valve in said last line, and means connected to said lever for closing said last valve upon a predetermined expansion of said first thermostat.

3. In combination, a heater, a damper for said heater, a lever connected to open said damper, a first thermostat for operating said lever, a burner for said thermostat, a line for supplying fuel to said burner in quantities to maintain a relatively restricted pilot flame at the burner, a valve in said line for adjusting the pilot flame, a line for supplying increased quantities of fuel to said burner to heat said thermostat, a valve in said last line, a second thermostat arranged in a space to be heated and controlling said valve with variations in the temperature of said space, a second valve in said last line, means connected to said lever for closing said second valve, upon a predetermined expansion of said first thermostat, a heater in the fuel supply line ahead of the valve controlled by said second thermostat, and a radiating chamber in said line and in proximity to said second thermostat for compensating for the thermal lag between the heat supply and the space heated.

4. In combination, a fuel supply line, a valve for said line, a thermostat subject to the temperature of a space to be heated for operating said valve with variations in the temperature of said space, a radiating chamber in said fuel supply line in proximity to said thermostat, and a heater for said fuel supply line anterior to both said valve and said radiating chamber whereby when the thermostat operates to open the valve and the temperature adjacent the thermostat is near the desired temperature the supply of heated fuel through said radiating chamber tends to hasten the closing of the valve in the fuel supply line.

5. In combination, a thermostat having regulating movement for regulating a heater for a space to be heated, a burner for heating said thermostat to expand the same, a fuel supply line for said burner, a thermostat subject to the heat of the space to be heated and operable to vary the fuel supply to said burner with variations in the temperature in said space, and a valve operable by the heater regulating movement of said first thermostat for reducing the supply of fuel to said burner ahead of the end of the regulating action of said second thermostat.

6. In combination, a heater for a space to be heated, regulating means for said heater, said regulating means including a regulating burner, a fuel supply line for said burner, a valve in said fuel supply line, a thermostat in the space to be heated and operating to control the valve in the fuel supply line for the regulating burner, a radiating chamber in said fuel supply line in proximity to said thermostat, and a heater for said fuel supply line anterior to both said valve and said radiating chamber whereby when the thermostat in the space to be heated operates to open the valve and the temperature of the space is near the desired temperature the supply of heated fuel through said radiating chamber tends to hasten the closing of the valve in the fuel supply line.

7. In combination, a heater for a space to be heated, a thermostat for regulating said heater, a burner for heating said thermostat, a fuel supply line for said burner, a valve for said fuel supply line, a thermostat subject to the temperature of the space to be heated and operating the valve for said fuel supply line to different regulating positions intermediate full open and full closed positions with variations in the temperature of said space, and means for reducing the fuel supply to the burner for said first thermostat independently of the room thermostat and ahead of the end of the regulating action of said first thermostat.

8. In combination, a heater for a space to be heated, a thermostat for regulating said heater, a burner for heating said thermostat, a fuel supply line for said burner, a thermostat subject to the temperature of the space to be heated and controlling said fuel supply line with variations in the temperature of said space, and means operated by the regulating action of said first thermostat for reducing the fuel supply to the burner for said first thermostat ahead of the end of the regulating action of said thermostat and as said thermostat approaches the end of its regulating action whereby the flow of fuel to the burner for said first thermostat is reduced independently of the room thermostat to that necessary to hold said first thermostat in the position to which it is actuated and without further actuating said first thermostat until the temperature requirements of the space to be heated have been met and the fuel supply to the burner for said first thermostat is varied by the thermostat subject to the temperature of the space to be heated.

9. In combination, a device to be regulated, a thermostat for regulating said device, a burner for said thermostat, means for supplying fuel to said burner in quantities to maintain a relatively restricted pilot flame at the burner and for supplying increased quantities of fuel to said burner to produce a regulating action in said thermostat, a second thermostat subject to the temperature of the space to be heated and controlling the increased fuel supply to the burner for said first thermostat with variations in the temperature of said space, and means operated independently of the room thermostat for varying the increased fuel supply to the burner for said first thermostat with the regulating action of said first thermostat and ahead of the end of the regulating action of said thermostat.

10. In combination, a heater for a space to be heated, a thermostat for regulating said heater, a burner for heating said thermostat, a line for supplying fuel to said burner in quantity to maintain a relatively restricted pilot flame at the burner, a second fuel supply line for said burner, a valve for said second fuel supply line, a thermostat subject to the temperature of the space to be heated and operating the valve for said second fuel supply line to different regulating positions intermediate full open and full closed positions with variations in the temperature of said space, and thermal sensitive means operated by the heat developed by the heater for closing said second fuel supply line when the heater reaches a predetermined temperature.

HOWARD W. ROYCE.